US010760925B2

(12) United States Patent
Beaurepaire et al.

(10) Patent No.: US 10,760,925 B2
(45) Date of Patent: Sep. 1, 2020

(54) METHOD AND APPARATUS FOR GENERATING A PARKING SEARCH ROUTE

(71) Applicant: HERE GLOBAL B.V., Eindhoven (NL)

(72) Inventors: Jerome Beaurepaire, Berlin (DE); Olivier Dousse, Lausanne (CH)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/170,951

(22) Filed: Oct. 25, 2018

(65) Prior Publication Data

US 2020/0132502 A1   Apr. 30, 2020

(51) Int. Cl.
*G01C 21/36* (2006.01)
*G01C 21/34* (2006.01)
*G06F 16/29* (2019.01)

(52) U.S. Cl.
CPC ..... *G01C 21/3685* (2013.01); *G01C 21/3492* (2013.01); *G01C 21/3676* (2013.01); *G06F 16/29* (2019.01)

(58) Field of Classification Search
CPC .......... G01C 21/3676; G01C 21/3492
See application file for complete search history.

(56) References Cited

U.S. PATENT DOCUMENTS

| 9,623,876 | B1 | 4/2017 | Slusar |
| 2014/0114529 | A1 | 4/2014 | An et al. |
| 2016/0061618 | A1 | 3/2016 | Benenson et al. |
| 2017/0103654 | A1 | 4/2017 | Gaebler et al. |
| 2017/0355307 | A1* | 12/2017 | Ha ............... G08G 1/143 |
| 2018/0340782 | A1* | 11/2018 | Tseng ........... G01C 21/3415 |

FOREIGN PATENT DOCUMENTS

WO    2016174670 A1   11/2016

OTHER PUBLICATIONS

Rhodes et al., "Smart Routing: A Novel Application of Collaborative Path-finding to Smart Parking Systems", Jul. 2014, 11 pages.

\* cited by examiner

*Primary Examiner* — Anne Marie Antonucci
*Assistant Examiner* — Abdalla A Khaled
(74) *Attorney, Agent, or Firm* — Ditthavong & Steiner, P.C.

(57) ABSTRACT

An approach is provided for generating an optimized parking search route based on one or more other vehicle driving paths. The approach involves determining that a first vehicle has initiated a search for a parking space. The approach also involves determining a first detection and a second detection of a second vehicle by the first vehicle during the search. The approach further involves calculating a predicted route taken by the second vehicle based on a time difference between the first detection and the second detection. The approach further involves generating the parking search route for the first vehicle based on deprioritizing the predicted route taken by the second vehicle.

20 Claims, 14 Drawing Sheets

METHOD AND APPARATUS FOR GENERATING A PARKING SEARCH ROUTE

BACKGROUND

Parking, like driving, is an integral aspect of operating a vehicle. However, finding available parking in areas where on-street parking is allowed (e.g., city centers, residential areas, etc.) can be difficult, time consuming, and often based on chance (e.g., being in the right spot when another vehicle is coincidentally leaving a parking spot). Moreover, having access to up-to-date available parking information at such locations can also be difficult (e.g., resource intensive, lack of available data points at a location, etc.). Accordingly, service providers face significant technical challenges to assist users to find on-street parking in a timely manner.

SOME EXAMPLE EMBODIMENTS

As a result, there is a need for providing a parking search route that increases the probability of finding available parking on a given set of roads or links within an area.

According to one embodiment, a computer-implemented method for generating a parking search route comprises determining that a first vehicle has initiated a search for a parking space. The method also comprises determining a first detection and a second detection of a second vehicle by the first vehicle during the search. The method further comprises calculating a predicted route taken by the second vehicle based on a time difference between the first detection and the second detection. The method further comprises generating the parking search route for the first vehicle based on deprioritizing the predicted route taken by the second vehicle.

According to another embodiment, an apparatus comprises at least one processor, and at least one memory including computer program code for one or more computer programs, the at least one memory and the computer program code configured to, with the at least one processor, cause, at least in part, the apparatus to determine that a first vehicle has initiated a search for a parking space. The apparatus is also caused to determine a first detection, a second detection, or a combination thereof of a second vehicle by the first vehicle during the search based on at least one sensor of the first vehicle. The apparatus is further caused to calculate a predicted route taken by the second vehicle based on a time difference between the first detection and the second detection. The apparatus is further caused to generate the parking search route for the first vehicle based on deprioritizing the predicted route taken by the second vehicle.

According to another embodiment, a non-transitory computer-readable storage medium carries one or more sequences of one or more instructions which, when executed by one or more processors, cause, at least in part, an apparatus to determine that a first vehicle has initiated a search for a parking space. The apparatus is also caused to determine a first detection and a second detection of a second vehicle by the first vehicle during the search. The apparatus is further caused to calculate a predicted route taken by the second vehicle based on a time difference between the first detection and the second detection. The apparatus is further caused to generate the parking search route for the first vehicle based on deprioritizing the predicted route taken by the second vehicle.

According to another embodiment, an apparatus comprises means for determining that a first vehicle has initiated a search for a parking space. The apparatus also comprises means for determining a first detection and a second detection of a second vehicle by the first vehicle during the search. The apparatus further comprises means for calculating a predicted route taken by the second vehicle based on a time difference between the first detection and the second detection. The apparatus further comprises means for generating the parking search route for the first vehicle based on deprioritizing the predicted route taken by the second vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating an optimized parking search route based on one or more other vehicle driving paths are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
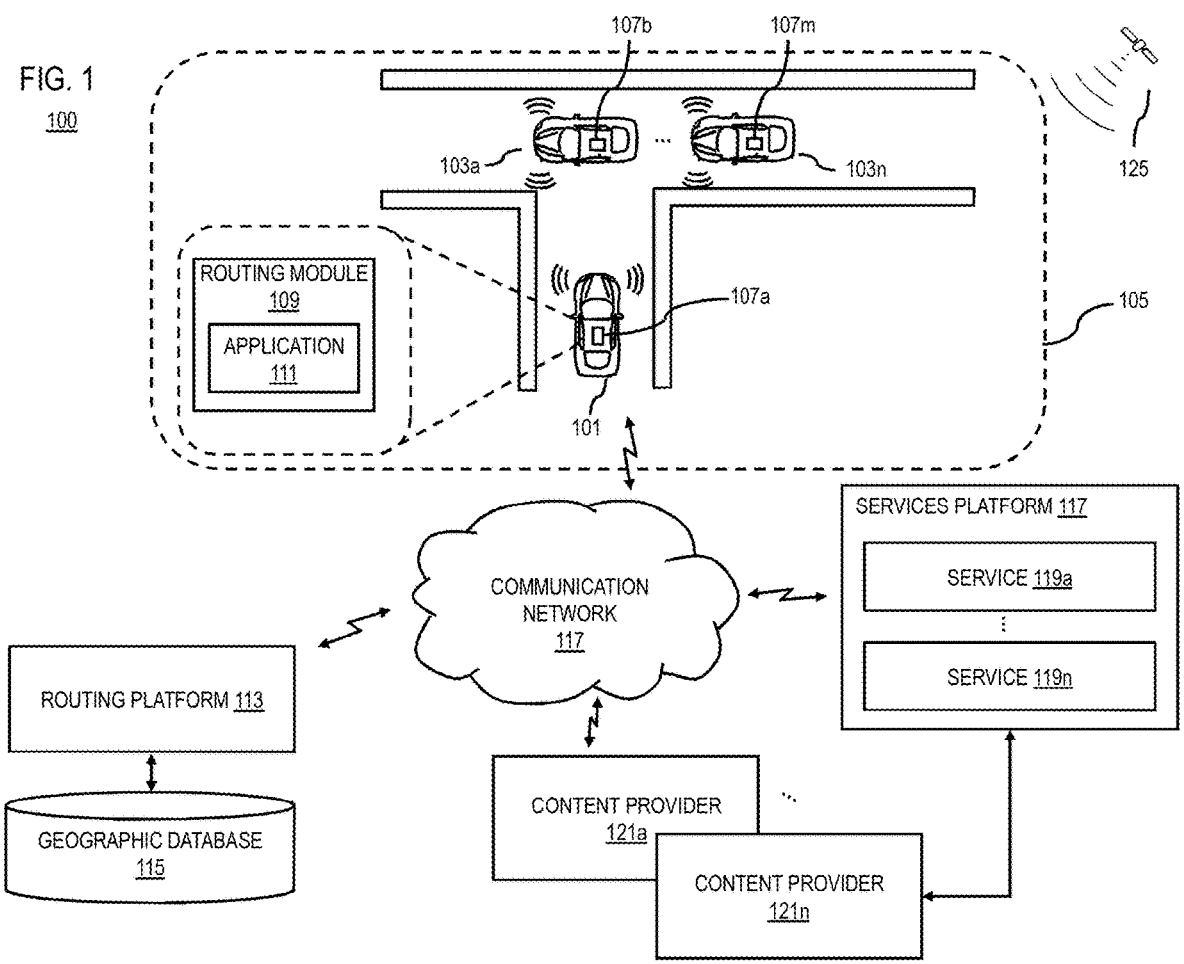
FIG. 1 is a diagram of a system capable of generating an optimized parking search route based on one or more other vehicle driving paths, according to one embodiment.

FIG. 1 is a diagram of a system capable of generating an optimized parking search route based on one or more other vehicle driving paths, according to one embodiment. Finding a parking space can be time consuming and frustrating, particularly in city centers or other similar areas where the number of parking spaces may be limited or the number of parkers is high. Historically, navigation systems (e.g., embedded car navigation systems) may offer assistance in these situations by indicating parking facilities (e.g., on-street parking, car parks, parking garages, etc.) that are nearby. The presentation of parking facilities typically is triggered when a driver or user approaches a known or predicted location. However, if all of the parking spots at those parking facilities are occupied by other cars, traditional navigation systems generally offer few alternatives other than to suggest other parking facilities.

More recent conventional systems attempt to address this problem by providing "real-time" parking availability data that are estimated from probe data, sensor data, and/or crowd-sourced data. These conventional systems would then typically recommend a parking search route than can maximize the chances that the user or vehicle will find an available parking space. However, because of the dynamic and highly changing nature of parking availability data (e.g., because vehicles may be constantly taking and leaving parking spaces), the delay between collecting the probe data, sensor data, and/or crowd-sourced data and the subsequent calculation of the resulting "real-time" parking availability data may cause the data to be not representative of actual parking conditions experienced by a vehicle in the area. Even in cases where such data can be provided in "real-time", accessing this "real-time" data typically must be performed over some type of data network (e.g., wireless data network). Therefore, when a data connection to the backend server is not available, the vehicle may not have access to real-time parking availability data.

In the absence of reliable parking data (e.g., parking search routes and/or guidance), users and/or corresponding vehicles may waste resources and time circling or driving around an area until parking is found. Therefore, service providers continue to face significant technical challenges to generating parking search routes to maximize the probability that a vehicle following that route will find a parking space.

To address these technical problems, a system 100 of FIG. 1 introduces a capability to generate an optimized parking search route to find parking in a given area by deducing or inferring the paths driven by other vehicles that are detected nearby and that are also seeking parking spots in the same area. The system 100 can then deprioritize the inclusion of the inferred driven paths in the optimized parking search route. In other words, the system 100 takes advantage of the general observation that people looking for parking spaces often cross or encounter the same vehicle(s) several times during their parking search. Encountering the same vehicle multiple times in the same area usually means that the encountered vehicle has been looking for parking in the same area and has yet to find it. The path that was driven by the encountered vehicle between the time of the first encounter and a subsequent encounter is likely to have no available parking. Therefore, those paths can be deprioritized or avoided during a parking search to improve the likelihood of finding parking. In this way, the system 100 can advantageously benefit from the data on the inferred paths covered by other vehicles encountered during a parking search.

As shown in FIG. 1, the system comprises a first vehicle 101 and at least one other vehicle 103*a*-103*n* (also collectively referred to as vehicles 103) that the vehicle 101 may encounter during a parking search in an area of interest 105. The vehicle 101 and/or vehicles 103 may be equipped with respective sensors 107*a*-107*m* (also collectively referred to as sensors 107) (e.g., camera sensors, proximity sensors, LiDAR, RADAR, etc.) for detecting the nearby presence (e.g., within a threshold distance) of other vehicles. In one embodiment, the vehicle 101 is further equipped with a routing module 109 (e.g., a vehicle navigation system or equivalent) executing one or more applications 111 (e.g., a navigation or mapping application) capable or generating parking search routes according to the various embodiments described herein. In addition or alternatively, the system 100 can include a routing platform 113 (e.g., a server-side component) for performing all or a portion of the functions associated with generating a parking search route based on the driven paths of other vehicles (e.g., vehicles 103).

Figure 2:
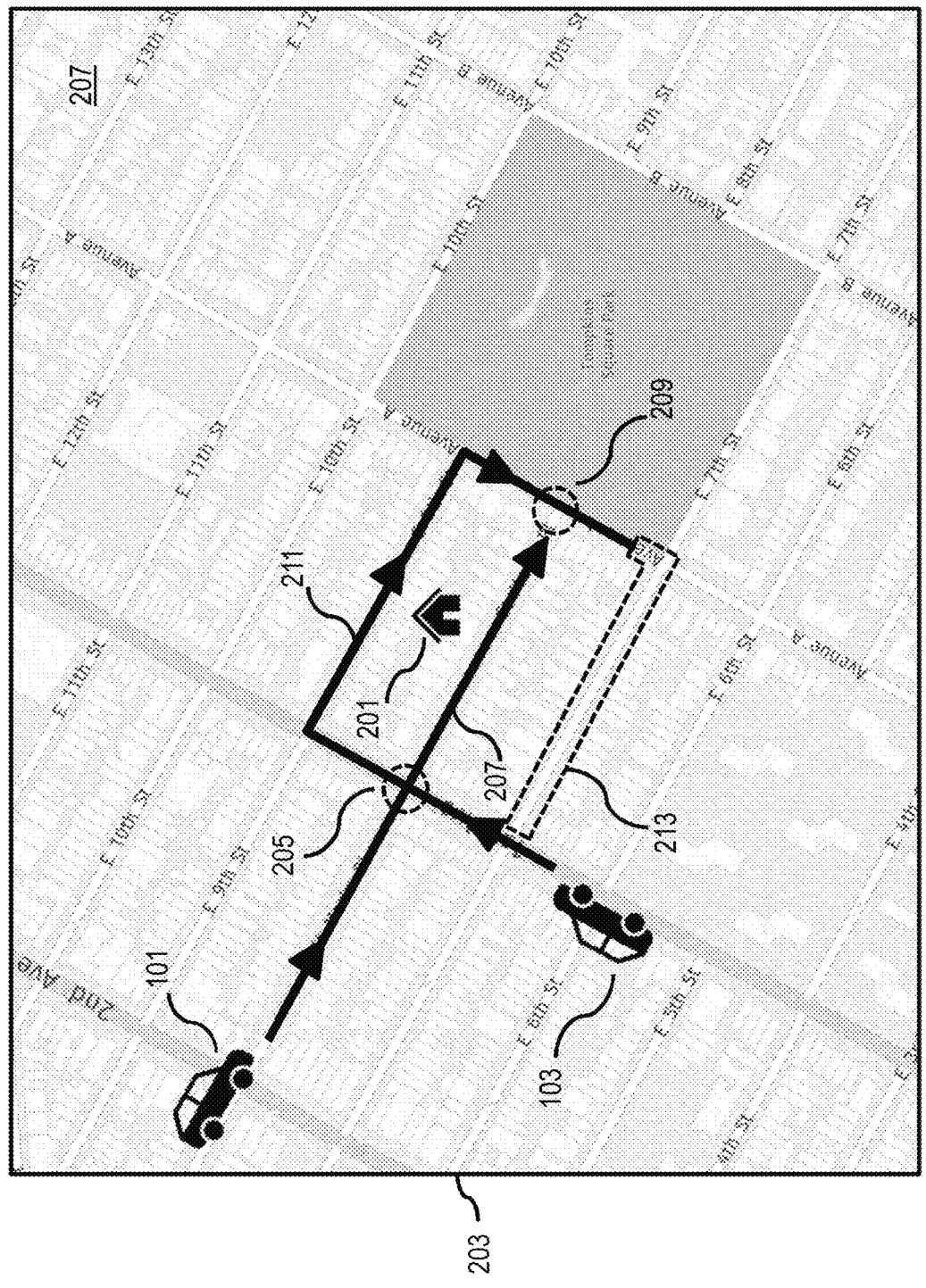
FIG. 2 is a diagram illustrating an example of generating an optimized parking search route based on the driving paths of other vehicles, according to one embodiment.

FIG. 2 is a diagram illustrating an example of generating an optimized parking search route based on the driving paths of other vehicles, according to one embodiment. As shown, Car 101 is looking for a parking spot near the driver's home 201 in an area 203 with on-street parking (e.g., downtown New York City). While driving and looking around for a free spot, Car 101 crosses Car 103 a first time at time t1 at a location indicated by the circle 205. Car 101 continues to drive and to look for a spot on a different segment 207 in the same area 203. Subsequently, Car 101 crosses Car 103 another time at time t2 at a location indicated by the circle 209.

In one embodiment, the system 100 (e.g., the routing module 109 in Car 101) recognizes Car 103 using its front camera (and/or any other equivalent sensor or process) and remembers seeing the Car 103 initially at time t1. Based on the second or subsequent sighting or encounter with the vehicle 103, the system 100 determines that Car 103 is most likely also looking for a parking spot. This inference is based, for instance, on the assumption that the vehicle 101 has encountered the vehicle 103 a second time because the vehicle 103 is also circling in the area to look for a parking spot. In this example, given the time difference between the encounter (e.g., time t241), the street geometry, and the driving restrictions in the area 203, the system 100 determines that Car 103 could only have taken one route 211 during the time period between encounters.

In one embodiment, the system 100 incorporates this new information (e.g., the route 211 driven by the vehicle 103 during its inferred parking search) to propose a new and optimized parking search route 213 for Car 103 to continue looking for a parking spot. This optimized parking search route 213, for instance, deprioritizes the path 211 already driven by Car 103 so that Car 101 can avoid searching the already covered path 211 for parking since presumably the Car 103 that drove the path 211 did not find parking (otherwise, Car 101 would not have encountered Car 103 the second time at location 209). In some embodiments, the system 100 can detect or otherwise determine various attributes of the Car 103 to determine whether its driven path 211 should be deprioritized. For example, the system 101 can determine whether the two vehicles 101 and 103 are approximately the same size so that they would occupy a similar sized parking space. By leveraging the inferred paths of other vehicles 103 that are likely to be searching for parking the same area, the system 100 enables the vehicle 101 to scan an area 203 for likely parking spots faster than vehicle 101 and/or its driver could use traditional parking search approaches (e.g., manual searches, traditional parking occupancy estimations, etc.).

Figure 3:
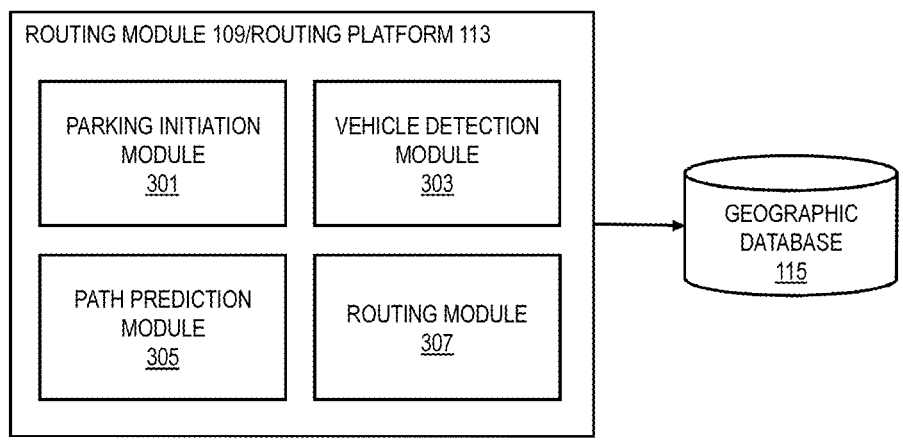
FIG. 3 is a diagram of the components of a routing module or platform, according to one embodiment.

As described above, in one embodiment, the routing module 109 (e.g., local to the vehicle 101) and/or the routing platform 113 (e.g., a server-side component) can perform the functions associated with generating an optimized parking search route based on paths driven by other vehicles according to the various embodiments described herein. FIG. 3 is a diagram of the components of the routing module 109/ routing platform 113, according to one embodiment. By way of example, the routing module 109 and/or platform 113 include one or more components for generating an optimized parking search route based on one or more other vehicle driving paths. It is contemplated that the functions of these components may be combined in one or more components or performed by other components of equivalent functionality. In one embodiment, the routing module 109 and/or platform 113 include a parking initiation module 301, a vehicle detection module 303, a path prediction module 305, and a routing module 307 with connectivity to a geographic database 115. The above presented modules and components of the routing module 109 and/or platform 113 can be implemented in hardware, firmware, software, or a combination thereof. Though depicted as separate entities in FIG. 1, it is contemplated that the routing module 109 and/or platform 113 may be implemented as a module of any of the components of the system 100. In another embodiment, the routing module 109, routing platform 113, and/or one or more of the modules 301-307 may be implemented as a cloud-based service, local service, native application, or combination thereof. The functions of the routing module 109, routing platform 113, and/or the modules 301-307 are discussed with respect to FIGS. 4-7 below.

Figure 4:
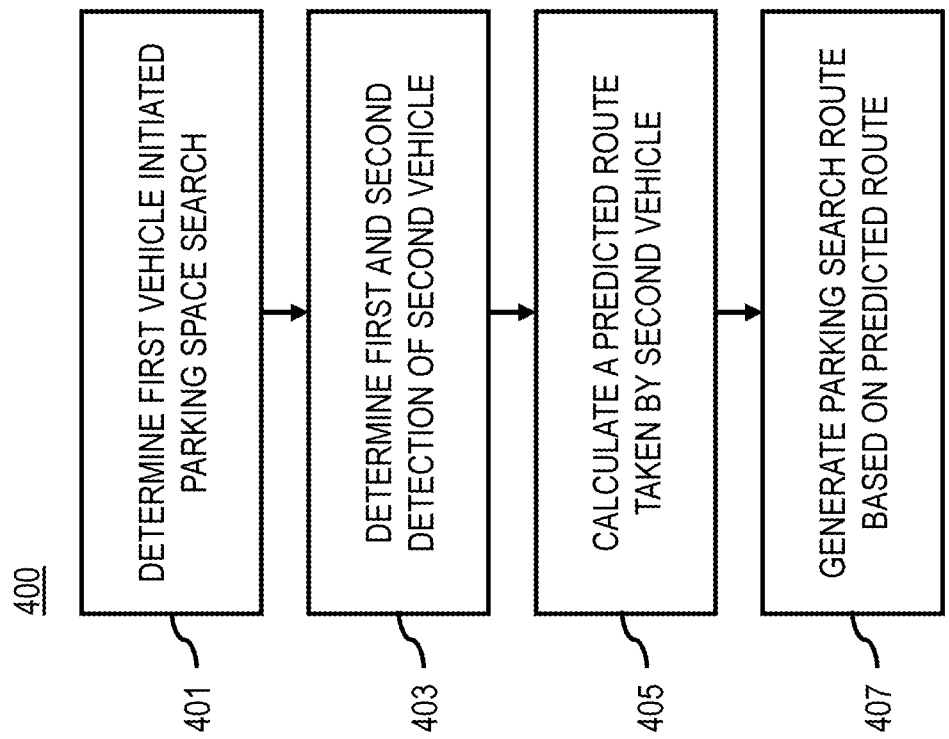
FIG. 4 is a flowchart of a process for generating an optimized parking search route based on one or more other vehicle driving paths, according to one embodiment.
Figure 11:
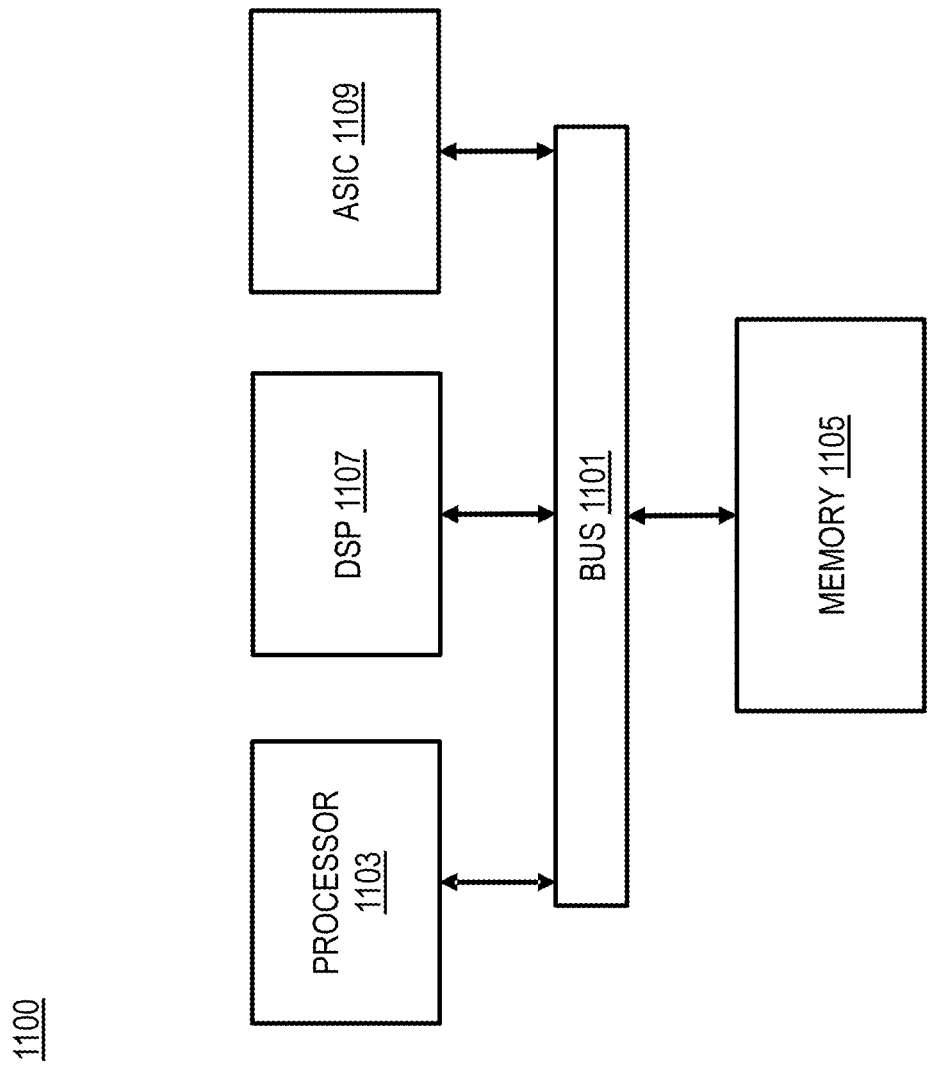
FIG. 11 is a diagram of a chip set that can be used to implement an embodiment of the invention.

FIG. 4 is a flowchart of a process for generating an optimized parking search route based on one or more other vehicle driving paths. In various embodiments, the routing module 109, routing platform 113, and/or the modules 301-307 may perform one or more portions of the process 400 and may be implement in, for instance, a chip set including a processor and a memory as shown in FIG. 11. As such, the routing module 109, routing platform 113, and/or modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the parking initiation module 301 determines that a first vehicle (e.g., vehicle 101) has initiated a search for a parking space. It is contemplated that the parking initiation module 301 can use any means to determine when the vehicle 101 has started a parking search. For example, the parking initiation module 301 can receive a manual input by a user that the user is looking for a parking space. In another example, the start of a parking search can be determined based on a routing request by the user (e.g., a route to a point of interest (POI) or other destination with parking nearby). In yet another example, the parking initiation module 301 can collect and process trajectory or probe data from the vehicle 101 to analyze for parking related behaviors (e.g., looping or circling over the same set of streets, slowing down, etc.).

In one example use case, a user or a passenger of the vehicle 101 may be looking to see if there is any on-street parking in a city center near her or his home, office, etc. or vehicle parking within a large parking lot (e.g., near a mall or shopping center). The parking initiation module 301 can determine that a user or a passenger of the vehicle 101 has started searching for a parking space based on an initiation of an application 111 (e.g., a parking application, a navigation application, a mapping application, etc.) executing, e.g., on a User Equipment (UE) such as a mobile device, an embedded navigation system, and/or the like. In addition or alternatively, the parking initiation module 301 can determine that a user or vehicle 101 has started searching for parking based on a combination of one or more vehicle related inputs (e.g., location, speed, direction, etc.). For example, the parking initiation module 301 can determine that the vehicle 101 is driving much slower than the known speed limit near the home or office of the user or passenger. In one instance, the parking initiation module 301 can determine that a user or vehicle 101 has started searching for parking based on a comparison of one or more temporal parameters (e.g., a day of time or day of the week), location information, and one or more entries in an application 111 (e.g., a doctor's appointment, grocery shopping, etc.).

After determining that a parking search has been started, the vehicle detection module 303 can begin detecting and monitoring for other vehicles (e.g., vehicles 103) that are encountered by the vehicle 101. For example, in step 403, the vehicle detection module 303 determines a first detection and a second detection of a second vehicle 103 by the first vehicle 101 during the parking search initiated by the vehicle 101. In one embodiment, the vehicle detection module 303 determines the first detection and the second detection based on at least one sensor (e.g., a sensor 107) associated with or otherwise equipped on the first vehicle 101. The sensor 107, for instance, can include a camera sensor (e.g., a front facing camera, a backwards facing camera, etc.). In this case, each detection can be based on a line-of-sight detection as seen from the field of view of the camera sensor.

In one embodiment, the image data generated by the camera sensor can then be processed using any image recognition or processing technique known in the art. In other words, the vehicle detection module 303 determines each detection of the second or other vehicle 103 based on image recognition. As part of the detection process, the vehicle detection module 303 can also detect identifying characteristics of the second vehicle 103, so that the vehicle detection module 303 can correlate a first or initial detection with any subsequent or second detections of the same vehicle 103. For example, the vehicle detection module 303 can determine that it is detecting the second vehicle 103 a second time based on determining and tracking a make, a model, and/or any other identifying feature of the second vehicle 103 such as, but not limited to, a license plate or any other unique feature (e.g., a logo, a sticker, a marking, etc.).

In one embodiment, the vehicle detection module 303 may determine each detection during a crossing or encounter between the first vehicle 101 and the second vehicle 103. A crossing or encounter refers, for instance, to a scenario where the first vehicle 101 and the second vehicle 103 approach each other within a distance threshold (e.g., based on a physical distance, sensor range, etc.). In one instance, the detection module 303 can determine the crossing based on a physical or a line-of-sight crossing between the first vehicle and the second vehicle such that a crossing occurs when the vehicle 103 appears in a line-of-sight of the first vehicle 101. In another instance, the vehicle detection module 303 need not use line-of-sight detection, and instead can determine the crossing or encounter if the second vehicle (e.g., vehicle 103) passes the first vehicle (e.g., vehicle 101) in a nearby street and is "visible" or detectable by any of the sensors even when there is no direct line-of-sight (e.g., via vehicle-to-vehicle (V2V) communications or any other non-line-of-sight means). In one embodiment, the vehicle detection module 303 may perform the first detection and the second detection locally at the first vehicle 101 as part of the routing module 109 of the vehicle 101, or on the server side via the routing platform 113 via the communication network 117.

In one embodiment, the vehicle detection module 303 can determine that the second vehicle 103 is unlikely looking for parking based on the image recognition and/or one or more identifying characteristics at the first detection regardless of whether the vehicle detection module 303 detects the second vehicle 103 one or more times. By way of example, the second vehicle 103 in this instance may be a taxi, a delivery vehicle, a rideshare vehicle, etc. Consequently, the path prediction module 305 need not waste resources to calculate the predicted route for such second vehicles 103 and/or only calculate the predicted route if there were no other second vehicle 103 in the area.

In step 405, the path prediction module 305 calculates a predicted route taken by the second vehicle 103 (e.g., the path driven by the vehicle 103) based on a time difference between the first detection and the second detection (e.g., time t2−t1). In other words, the path prediction module 303 can identify paths or routes that the vehicle 103 may have taken to travel from the location of the vehicle 103 when it encountered the vehicle 101 the first time and its location at the second encounter within the period of time between the two encounters. For example, the path prediction module 305 calculates the predicted route based on the route or routes that the second vehicle 103 could have taken during the time t2−t1 given the street geometry, driving restrictions, parking restrictions, etc. in the area of interest. The street geometry (e.g., road link or segment lengths, road widths, intersections, turns, etc.), driving/parking restrictions (e.g., restricted turns, parking restrictions, etc.), street or path attributes (e.g., speed limits, heading/direction, functional class, number of lanes, etc.), can be queried from the geographic database 115 or equivalent data source. In other words, the path prediction module 305 can determine the probable paths based on street geometry data (e.g., road width), driving restriction data (e.g., speed, direction of travel, etc.), traffic information, parking restriction data (e.g., time of day, day of week, etc.), or a combination thereof for a geographic area in which the second vehicle 103 is identified in the first detection, the second detection, or a combination thereof. The path prediction module 305, in one instance, may perform the calculation of the predicted route locally at the first vehicle 101 or on the network side via the communication network 117.

In one embodiment, if the vehicle detection module 303 determines that the second vehicle 103 is known to the first vehicle 101 (e.g., the users or drivers of the respective vehicles are friends), then the path prediction module 305 can identify the paths or routes that the second vehicle 103 may have taken based on one or more parameters unique to that user or driver (e.g., historically traveled routes, preferred routes, etc.). In another embodiment, if the vehicle detection module 303 determines a first detection and a second detection of more than one vehicle 103 (i.e., several vehicles 103 are being simultaneously monitored), then the path prediction module 305 can calculate the predicted route taken by each vehicle 103 based on the order in which the vehicle detection module 303 detected each vehicle 103.

If the path prediction module 305 determines that there is only one possible path for the vehicle 103 to travel given the amount of time between encounters/crossings and/or given other road geometries/attributes, the sole predicted path can be labeled as having a high confidence (e.g., confidence above a threshold value). In cases where multiple paths are possible or predicted, the path prediction module 103 can also calculate associated confidence levels or probabilities that a given predicted path represents the actual path traveled. The confidence, for instance, can be based on road attributes, path popularity, historical drives, and/or the like.

In step 407, the routing module 307 generates an optimized parking search route for the first vehicle 101 based on deprioritizing the predicted route taken by the second vehicle 103. By way of example, the predicted route is deprioritized by the routing module 307 so that the user or passenger of the first vehicle 101 can benefit from the paths covered by the second vehicle 103. For example, the routing module 307 can infer that because the second vehicle 103 is still driving around looking for a parking space (e.g., as evidenced by the second encounter) that there were no available parking spaces on the route covered by the second vehicle 103 during the time t2–t1. Additionally, the routing module 307 can also infer that given the short period of time that elapsed between time t1 and time t2, that the parking situation on the route covered by the second vehicle 103 is likely still the same as it was when the second vehicle 103 was traveling the route. As a result, the routing module 307 can increase the probability of the first vehicle 101 finding a parking space by temporarily excluding the route of the second vehicle 103 from its search. In one embodiment, the routing module 307 can also generate an optimized parking search route that includes a nearby suitable destination that increases the user's or driver's chances to find a parking spot in the area rather a route based on the first vehicle 101 continuing to drive. By way of example, a suitable destination may include a destination where users often spend a short amount of time away from their vehicles (e.g., a gasoline station, a convenience store, etc.).

In one embodiment, it is contemplated that as time passes, the routing module 307 may again begin prioritizing the route covered by the second vehicle 103 given the limited number of convenient options (e.g., alternative parking search routes) in the area. For example, if the first vehicle 101 keeps meeting or encountering the second vehicle 103 but then stops encountering the second vehicle 103, the routing module 307 can infer that the second vehicle 103 found a parking space and that there may be more free spots in that vicinity. Consequently, in one embodiment, the routing module 307 can include the spot where the second vehicle 103 likely found a parking space in the optimized parking search route. In one embodiment, the routing module 307 may generate the parking search route locally at the first vehicle 101 or via the server-based routing platform 113 over the communication network 117.

Figure 5:
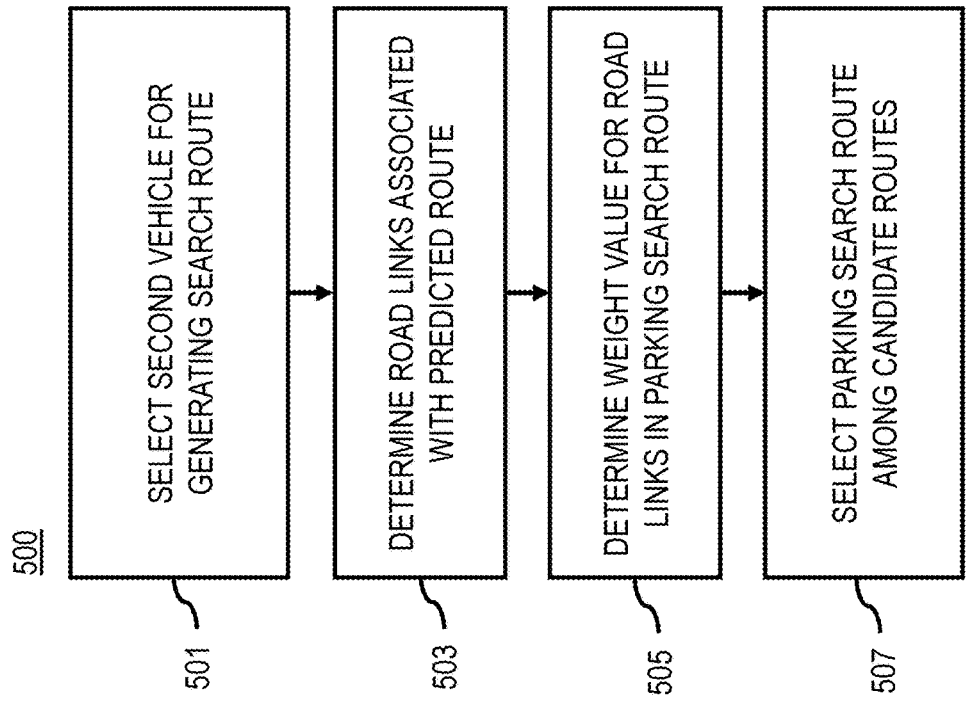
FIG. 5 is a flowchart of a process for deprioritizing the predicted route taken by one or more other vehicles, according to one embodiment.

FIG. 5 is a flowchart of a process for deprioritizing the predicted route taken by one or more other vehicles, according to one embodiment. In various embodiments, the routing module 109, routing platform 113, and/or modules 301-307 may perform one or more portions of the process 500 and may be implement in, for instance, a chip set including a processor and a memory as shown in FIG. 11. As such, the routing module 109, routing platform 113, and/or modules 301-307 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps. In one embodiment, the process 500 describes additional steps that can be performed in combination with the process 400 described above.

In step 501, the vehicle detection module 301 can determine which of the other vehicles 103 that are to be used for generating optimized parking search routes based on the characteristics of the vehicles 101 and 103. For example, the vehicle detection module 301 selects the second vehicle 103 for generating the parking search route based on determining that the first detection indicates that the second vehicle 103 has a size that is within a threshold similarity as the first vehicle 101. By comparing the respective sizes of the vehicles 101 and 103, the vehicle detection module 301 can ensure only the driven routes from vehicles that would occupy similarly-sized parking spots would be used for generating optimized parking search routes according to the various embodiments described herein. The predicted route taken by the second vehicle 103, for instance, may only be relevant to the first vehicle 101 if the first vehicle 101 can park in the same or similar space as the second vehicle 103. In one embodiment, in addition to size, the vehicle detection module 301 may also weight one or more unique features of the second vehicle 103 for generating the optimized parking search route. For example, if the vehicle detection module 301 determines that the second vehicle 103 requires disability parking, then the predicted route driven by the second vehicle 103 may not be as relevant to the first vehicle 101.

In one embodiment, the predicted routes driven by the second vehicle 103 is determined with respect to road link or segments represented in the geographic database 115. Accordingly, in step 503, the path prediction module 305, determines one or more road links associated with the predicted route by querying for or otherwise map matching the predicted route to corresponding road links, nodes, etc. In other words, the path prediction module 305 can determine the one or more road links based on mapping or navigation information stored in a geographic database 115. In some embodiments, the path prediction module 305 can determine the one or more road links or predicted driven paths based on probe data associated with the first vehicle 101 and/or second vehicle 103.

In step 505, the routing module 307, deprioritizes the predicted driven paths of the second vehicle 103 by decreasing a weight value for including the one or more road links in the parking search route generated for the first vehicle 101. By way of example, the one or more road links are the portions of the predicted route traveled by the second vehicle 103 between the time t1 and time t2. In one embodiment, the routing module 307 can apply weight values to the one or more road links to indicate that the one or more road links are unlikely to have available parking spaces. For example, the routing module 307 can infer that the second vehicle 103 would have parked in a space if a space was available. In one instance, the routing module 307 can weigh the one or more road links with the same weight or slightly more weight than the one or more road links already traveled by the first vehicle 101 (i.e., attributing more weight to an actual observation compared to an assumption).

In step 507, the routing module 307 selects the parking search route for the first vehicle 101 from among one or more candidate routes based on the parking search route having a minimum overlap with the predicted route taken by the second vehicle 103. In one embodiment, the routing module 307 can compare the predicted route taken by the second vehicle 103 with the parking search route to be generated the first vehicle 101 so that the routing module 407 can exclude as much of the one or more links traveled by the second vehicle 103 from the generated parking search route. In one instance, the routing module 307 can compare the predicted route taken by the second vehicle 103, the route already taken by the first vehicle 101, and/or the one or more remaining untraveled links in the area so that the routing module 307 can exclude as much of the predicted route and the already traveled route of the first vehicle 101 from the generated parking search route.

Figure 6:
FIG. 6 is a flowchart of a process for addressing potential privacy issues associated with generating an optimized parking search route, according to one embodiment.

FIG. 6 is a flowchart of a process for addressing potential privacy issues associated with generating an optimized parking search route, according to one embodiment. In various embodiments, the routing module 109, routing platform 113, and/or modules 301-307 may perform one or more portions of the process 600 and may be implement in, for instance, a chip set including a processor and a memory as shown in FIG. 11. As such, the routing module 109, routing platform 105, and/or modules 301-307 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps. In one embodiment, the process 600 can be perform after completing the process 400 and/or process 500 describe above.

In step 601, the routing module 307 deletes data records of the first detection, the second detection, the second vehicle 103, the predicted route taken by the second vehicle 103, or a combination thereof after the generating of the parking search route for the first vehicle 101. In one instance, the routing module 307 can delete the related data records stored in the geographic database 115 after the first vehicle 101 reaches the available parking position to avoid any privacy violation issues and/or reduce any privacy concerns. In one embodiment, the routing module 307 only stores the minimum amount of information required to identify any of the vehicles 101 and/or 103 for the same reason. In other words, any vehicle identifying data generated or used by the system 100 to generate an optimized parking search route according to the embodiments described herein can be stored temporarily or otherwise anonymized (e.g., obscure license plates or other unique identifiers) to preserve privacy.

Figure 7:
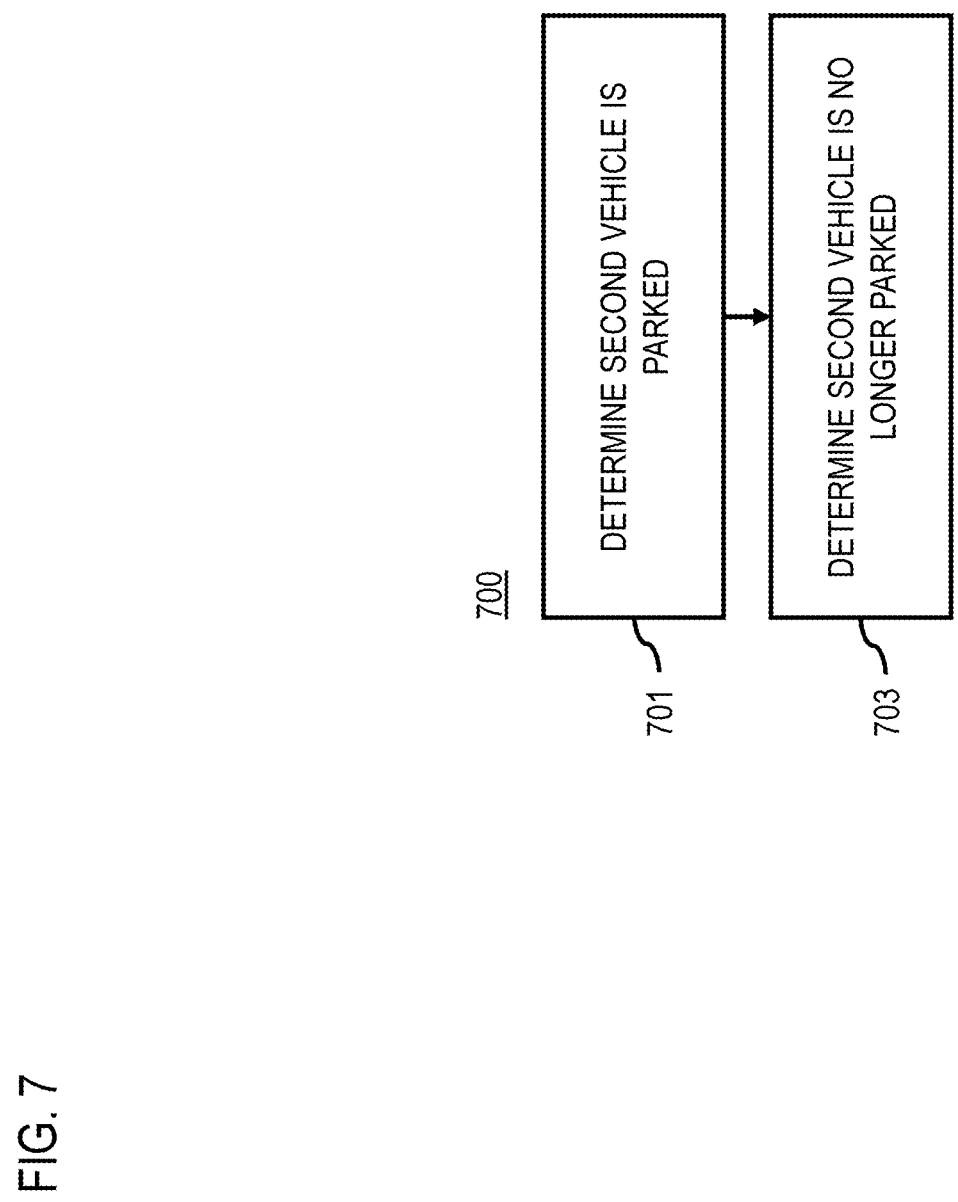
FIG. 7 is a flowchart of a process for generating an optimized parking route search based on one or more attributes of one or more other vehicles, according to one embodiment.

FIG. 7 is a flowchart of a process for generating an optimized parking route search based on one or more attributes of one or more other vehicles, according to one embodiment. In various embodiments, the routing module 109, routing platform 113, and/or the modules 301-307 may perform one or more portions of the process 700 and may be implement in, for instance, a chip set including a processor and a memory as shown in FIG. 11. As such, the routing module 109, the routing platform 105, and/or the modules 301-307 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps. In one embodiment, the process 700 describes additional steps that can be performed in combination with the processes 400 and 500 described above.

In step 701, the vehicle detection module 303 determines that the first detection indicates that the second vehicle 103 is parked on a road link in an area of interest 105. By way of example, once the vehicle detection module 303 detects the second vehicle 103 based on a sensor 107 (e.g., a front facing camera) and processes the generated image data to determine one or more identifying features of the second vehicle 103 (e.g., a vehicle make, model, a license plate, etc.), then the path prediction module 305 can query one or more databases (e.g., the geographic database 115) based on the identifying features to determine whether the second vehicle 103 was recently parked.

In step 703, the path prediction module 305 determines that the second detection indicates that the second vehicle 103 is no longer parked on the road link, wherein the parking search route is generated based on a prioritizing of the road link. By way of example, if the vehicle detection module 303 determines that the second vehicle 103 is "met" again a few minutes after the path prediction module 305 determined that the second vehicle 103 was parked, then the routing module 307 could infer that the second vehicle 103's parked position likely became free, increasing the first vehicle 101's chances to find an available parking spot on that segment.

Returning to FIG. 1, in one embodiment, the routing module 109 and the application 111 may be part of or associated with a UE (e.g., a mobile device, an embedded navigation system, and/or the like) associated with the vehicle 101 or a user or a passenger of the vehicle 101. By way of example, the UE can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE can support any type of interface to the user (such as "wearable" circuitry, etc.). In one embodiment, the vehicle 101 may have cellular or wireless fidelity (Wi-Fi) connection either through the inbuilt communication equipment or the UEs associated with the vehicle 101. Also, the UE may be configured to access the communication network 117 by way of any known or still developing communication protocols. In one embodiment, the UE may include the routing module 109 and/or an application 111 (e.g., a navigation or map application) to request and/or receive parking guidance or assistance (e.g., a parking search route).

In one embodiment, the routing platform 113 performs the process for generating a parking search route as discussed with respect to the various embodiments described herein. In one embodiment, the routing platform 113 can be a stand-alone server or a component of another device with connectivity to the communication network 117. For example, the component can be part of an edge computing network where remote computing devices (not shown) are installed along or within proximity of the area. In one embodiment, the routing platform 113 has connectivity over the communication network 117 to the services platform 119 (e.g., an OEM platform) that provides one or more services 121a-121n (also collectively referred to herein as services 121) (e.g., vehicle route prediction or probability services). By way of example, the services 121 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 123a-123n (also collectively referred to herein as content providers 123) may provide content or data (e.g., navigation-based content such as destination information, routing instructions, point of interest (POI) data, historical data, etc.) to the vehicle 101, the routing module 109, the application 111, the routing platform 113, the services platform 119, and the services 121. The content provided may be any type of content, such as map content, contextual content, audio content, video content, image content, etc. In one embodiment, the content providers 123 may also store content associated with the vehicle 101, the routing module 109, the application 111, the routing platform 113, the services platform 119, the services 121, and/or the geographic database 115. In another embodiment, the content providers 123 may manage access to a central repository of data, and offer a consistent, standard interface to data, such as a repository of the geographic database 115.

By way of example, as previously stated the sensors 107 may be any type of sensor. In certain embodiments, the sensors 103 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., front facing cameras, backwards facing cameras, or combination thereof for detecting a make, model, or license plate of a vehicle 103), velocity sensors, and the like. In another embodiment, the sensors 107 may include sensors (e.g., mounted along a perimeter of the vehicle 101) to detect the relative distance of the vehicle from lanes or roadways, the presence of other vehicles 103, pedestrians, animals, traffic lights, road features (e.g., curves) and any other objects, or a combination thereof. In one scenario, the sensors 107 may detect weather data, traffic information, or a combination thereof. In one example embodiment, the vehicle 101 may include GPS receivers to obtain geographic coordinates from satellites 125 for determining current or live location and time. Further, the location can be determined by a triangulation system such as A-GPS, Cell of Origin, or other location extrapolation technologies when cellular or network signals are available. In another example embodiment, the services 121 may provide in-vehicle navigation services.

The communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the routing platform 113 may be a platform with multiple interconnected components. By way of example, the routing platform 113 may include multiple servers, intelligent networking devices, computing devices, components and corresponding software for generating an optimized parking search route based on one or more other vehicle driving paths. In addition, it is noted that the routing platform 113 may be a separate entity of the system 100, a part of the services platform 119, the one or more services 121, or the content providers 123.

In one embodiment, the geographic database 115 stores information regarding one or more roads or parking lot paths within the area of interest 105 (e.g., street geometry data, driving restrictions data, parking restriction data, or a combination thereof). The information may be any of multiple types of information that can provide means for providing navigation-based content (e.g., a predicted route of a vehicle). In another embodiment, the geographic database 115 may be in a cloud and/or in a vehicle 101, the routing module 109, a mobile device, or a combination thereof.

By way of example, the vehicle 101, the routing module 109, the application 111, the routing platform 113, the geographic database 115, the services platform 119, the services 121, and the content providers 123 communicate with each other and other components of the communication network 117 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8A:
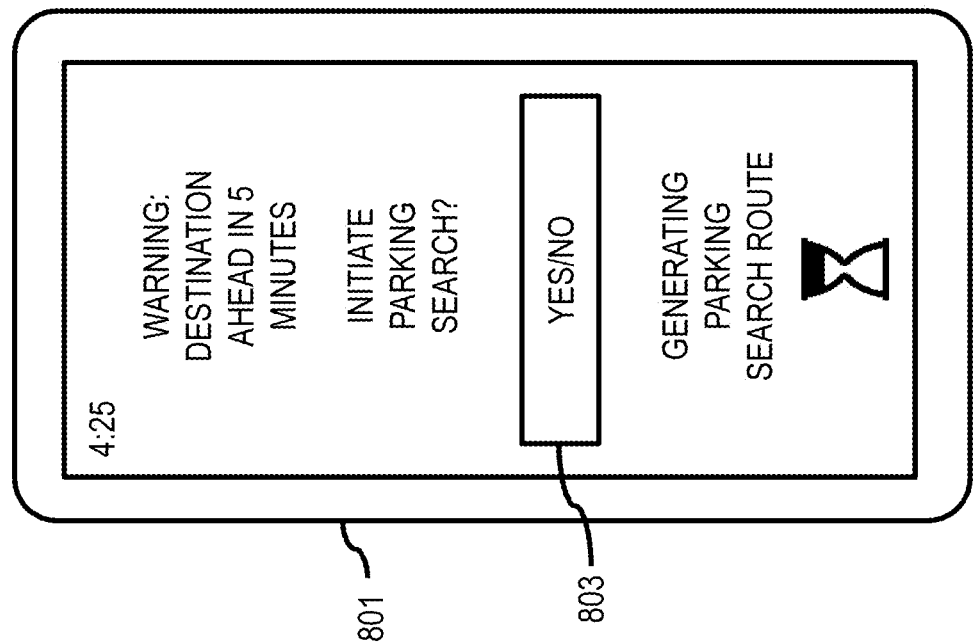
FIGS. 8A-8C are diagrams of example user interfaces for generating an optimized parking search route, according to one embodiment.
Figure 8B:
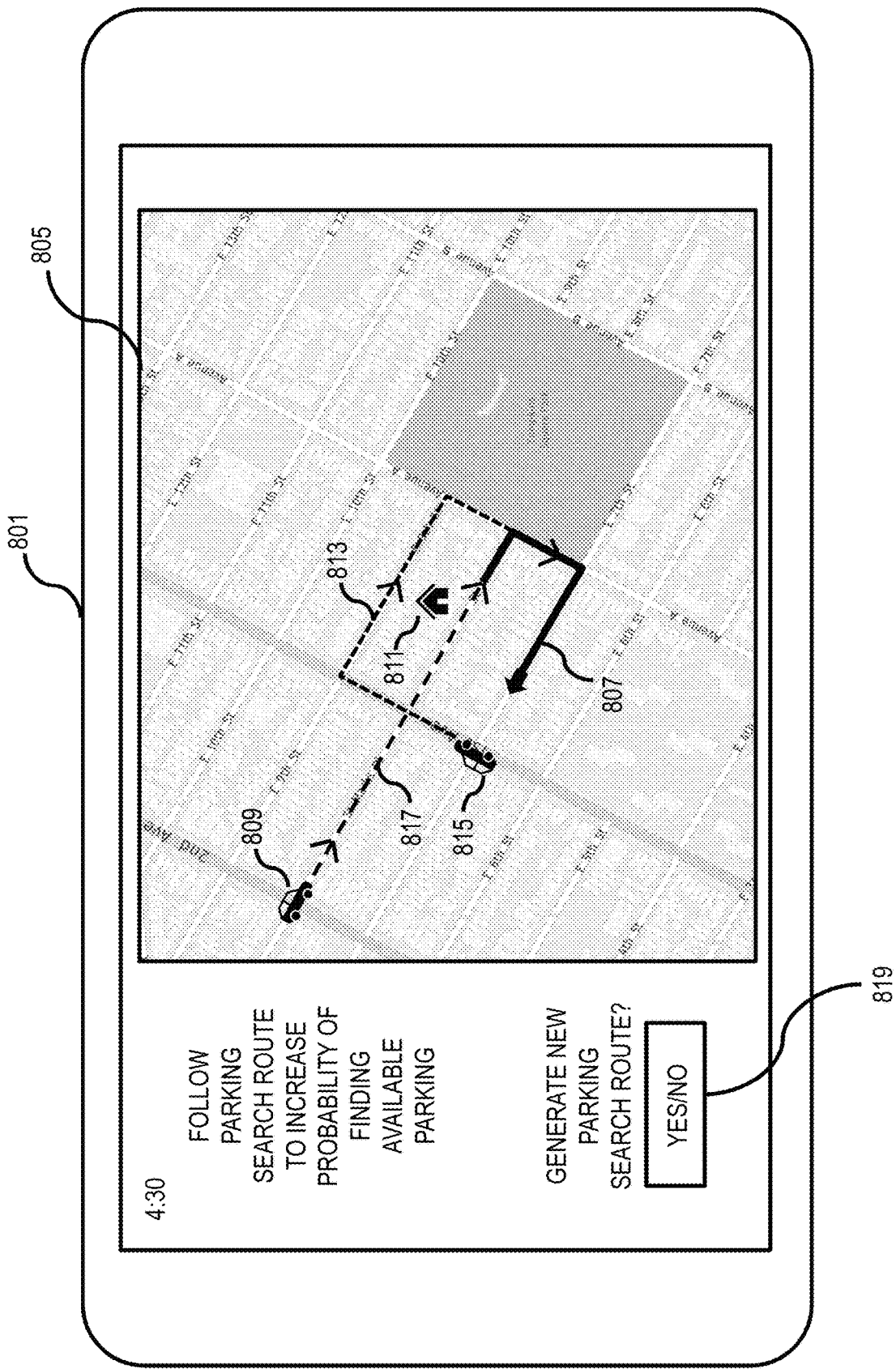
Figure 8C:
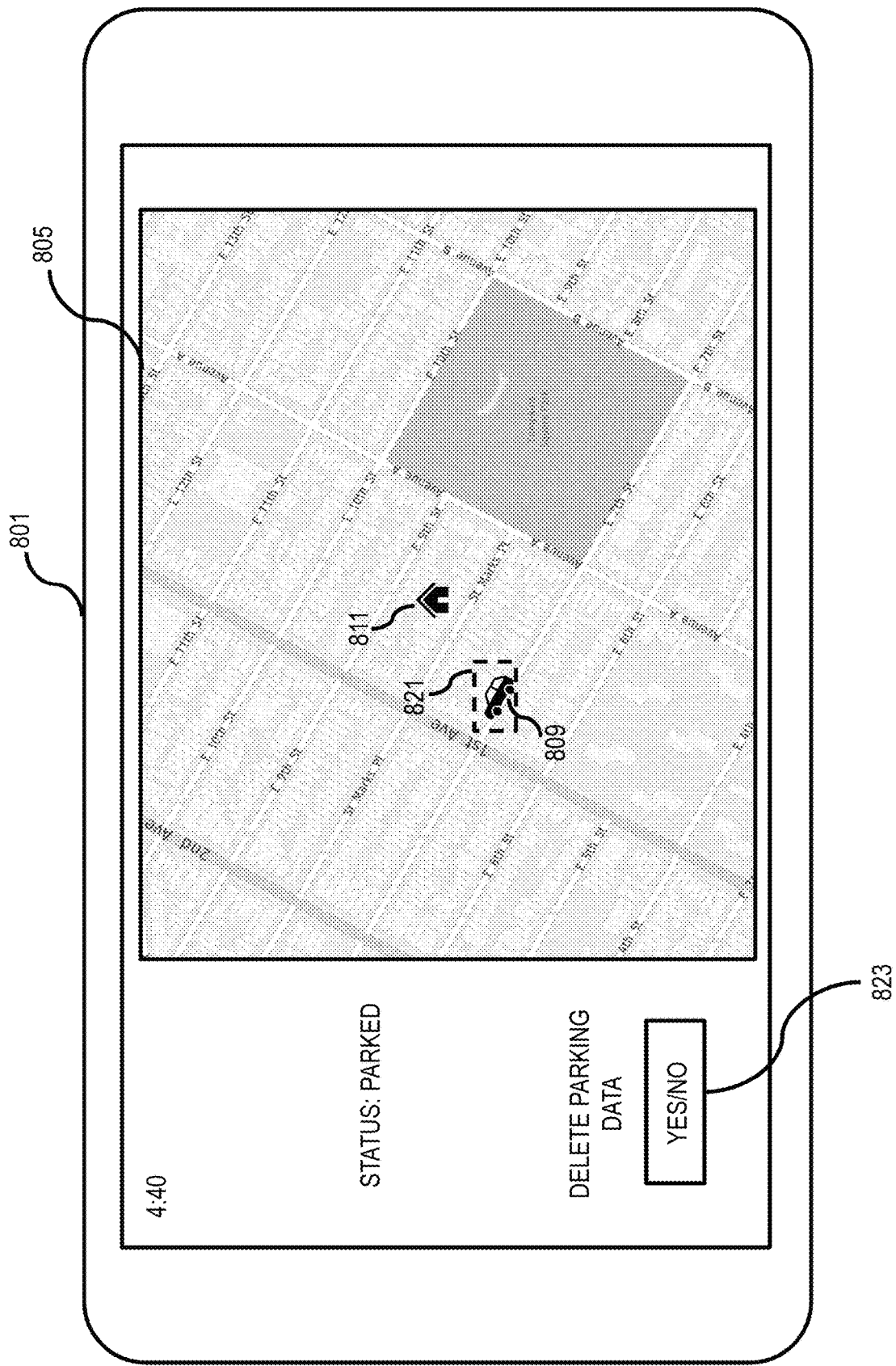

FIGS. 8A-8C are diagrams of example user interfaces for generating an optimized parking search route, according to one embodiment. In this example, a UI 801 is generated for a UE (e.g., a vehicle navigation device, a mobile device, or a combination thereof) that includes an input 803 that enables a user or a passenger of the vehicle 101 to select the parking search route from among one or more candidate routes based on a degree of parking search overlap. By way of example, the routing module 109/routing platform 113 can determine that vehicle 101 is searching for parking near the driver's home in a dense city center (e.g., downtown New York) at 5:30 in the afternoon midweek, a time that is historically difficult to find on-street parking. In this example, the UI 801 can prompt the user or passenger of the vehicle 101 that they are approaching their destination (e.g., "warning: destination ahead in 5 minutes") and can ask that the user or passenger adjust the level of parking search overlap by virtually sliding the input 803 between a minimum overlap and a maximum overlap.

As shown in FIG. 8B, in one embodiment, the routing module 109/routing platform 113 can generate an optimized parking search route 805 that minimizes the overlap with the predicted route taken by the second vehicle 103 (e.g., route 807), as described more fully with respect to FIGS. 4 and 5. The routing module 109/routing platform 113, in one instance, can prompt the user or passenger of the vehicle 101 to follow the highlighted optimized parking searching route 805 to increase the probability of finding available parking near the user's or passenger's home 809 at this time of day. In one instance, the routing module 109/routing platform 113 can render the route already taken by the vehicle 101 (e.g., route 811) as well as the predicted route 807 of the vehicle 103 so that the user or passenger of the vehicle 101 may have a visual appreciation of the nearby area that has already been covered and, therefore, has a low probability of containing an available parking spot. For example, it may be helpful to know for future reference where the vehicle 103 thought to search for parking in the area. In one embodiment, the UI 801 includes an input 813 to enable the user or the passenger of the vehicle 101 to generate a new parking search route if, for example, the generated parking search route 805 does not yield any available parking spaces within a certain threshold of time.

Referring to FIG. 8C, in one embodiment, once a user or a passenger of the vehicle 101 has found a parking space 815 and has parked the vehicle 101 therein (e.g., 10 minutes later), the UI 801 can include an input 817 to enable the user or the passenger of the vehicle 101 to delete the parking related data used by the routing module 109/routing platform 113 to generate the parking search route 805 (e.g., records of the first detection, the second detection, the vehicle 103, the predicted route 807, the route taken by the vehicle 101, or a combination thereof) to avoid any potential privacy violation issues and/or reduce any privacy concerns. In one embodiment, it is contemplated that the inputs 803, 813, and 817 of the UI 801 can enable a user or a passenger of the vehicle 101 to interact with the routing module 109/routing platform 113 through one or more physical gestures (e.g., a touch, a tap, a swipe, etc.), one or more voice commands (e.g., "yes," "no," "initiate search," "delete data," etc.), or a combination thereof.

Figure 9:
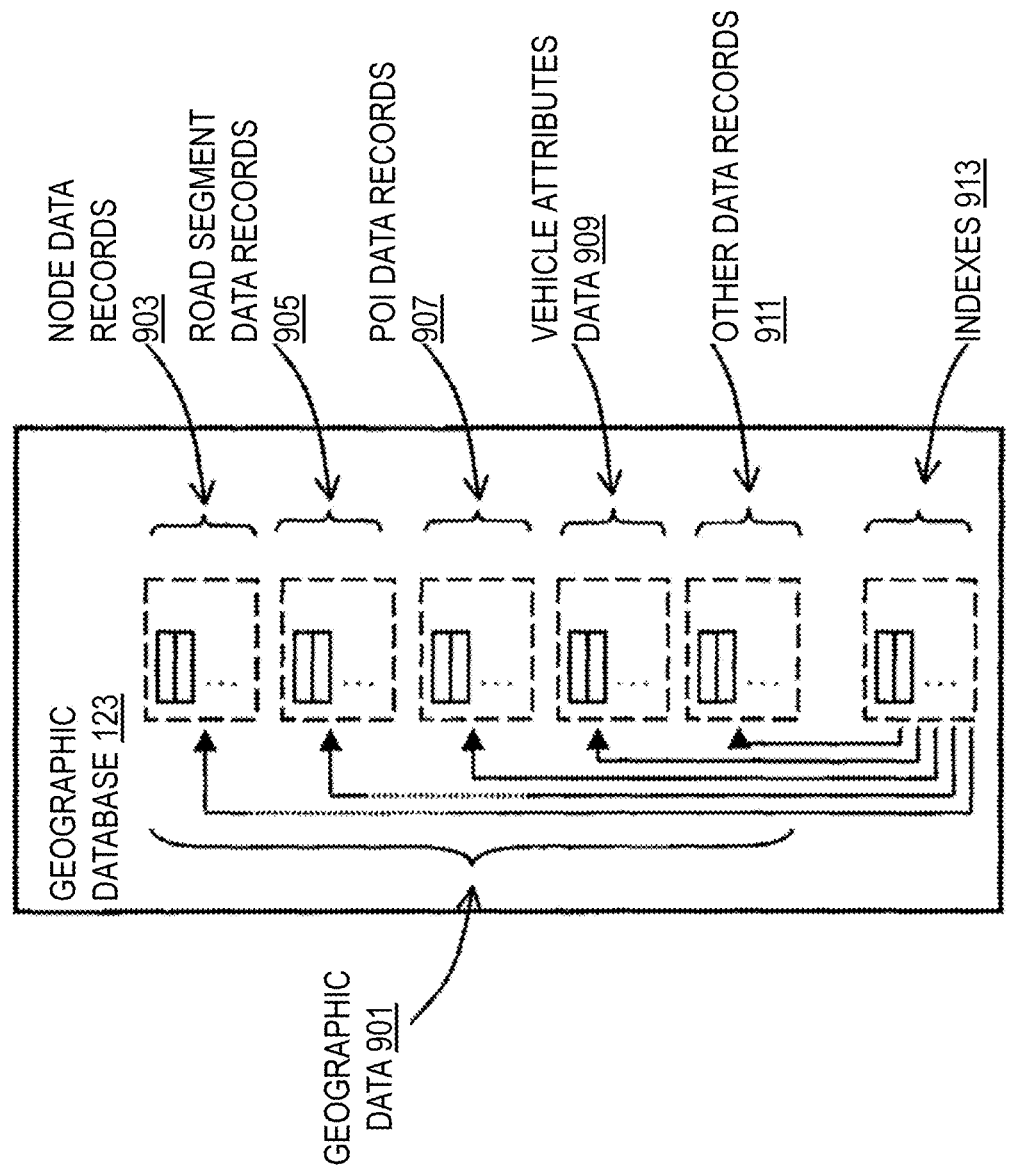
FIG. 9 is a diagram of a geographic database, according to one embodiment.

FIG. 9 is a diagram of the geographic database 115, according to one embodiment. In one embodiment, parking search route information and/or any other information used or generated by the system 100 with respect to generating an optimized parking search route based on one or more other vehicle driving paths can be stored, associated with, and/or linked to the geographic database 115 or data thereof. In one embodiment, the geographic or map database 115 includes geographic data 901 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 115 includes node data records 903, road segment or link data records 905, POI data records 907, vehicle attributes data 909, other data records 911, and indexes 913, for example. More, fewer or different data records can be provided. In one embodiment, the other data records 911 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 907 may also include information on locations of traffic controls (e.g., stoplights, stop signs, crossings, etc.), driving restrictions (e.g., speed, direction of travel, etc.), or a combination thereof.

In exemplary embodiments, the road segment data records 905 are links or segments representing roads, streets, or paths, as can be used in calculating the predicted route of one or more other vehicles. The node data records 903 are end points corresponding to the respective links or segments of the road segment data records 905. The road link data records 905 and the node data records 903 represent a road network, such as used by vehicles, cars, and/or other entities. Alternatively, the geographic database 115 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, shopping centers or malls, parking lots, automobile dealerships, auto repair shops, buildings, stores, parks, etc. The geographic database 115 can include data about the POIs and their respective locations in the POI data records 907. The geographic database 115 can also include data about places, such as cities, city centers, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the vehicle attributes data 909 can include any data item used to detect or identify a vehicle such as a vehicle make/model, license plate, or any other unique feature (e.g., a logo, sticker, marking, etc.). In one instance, the vehicle attributes data 909 can also include any data related to a status of a vehicle (e.g., parked, moving, a position, etc.).

The geographic database 115 can be maintained by the content providers 123 in association with the services platform 119 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database 115 or data in the master geographic database 115 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 115 can be a master geographic database, but in alternate embodiments, the geographic database 115 can represent a compiled navigation database that can be used in or with end user devices (e.g., a UE) to provide navigation-related functions. For example, the geographic database 115 can be used with the end user device to provide an end user with navigation features. In such a case, the geographic database 115 can be downloaded or stored on the end user device, such as in the application 111, or the end user device can access the geographic database 115 through a wireless or wired connection (such as via a server and/or the communication network 117), for example.

The processes described herein for generating an optimized parking search route based on one or more other vehicle driving paths may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
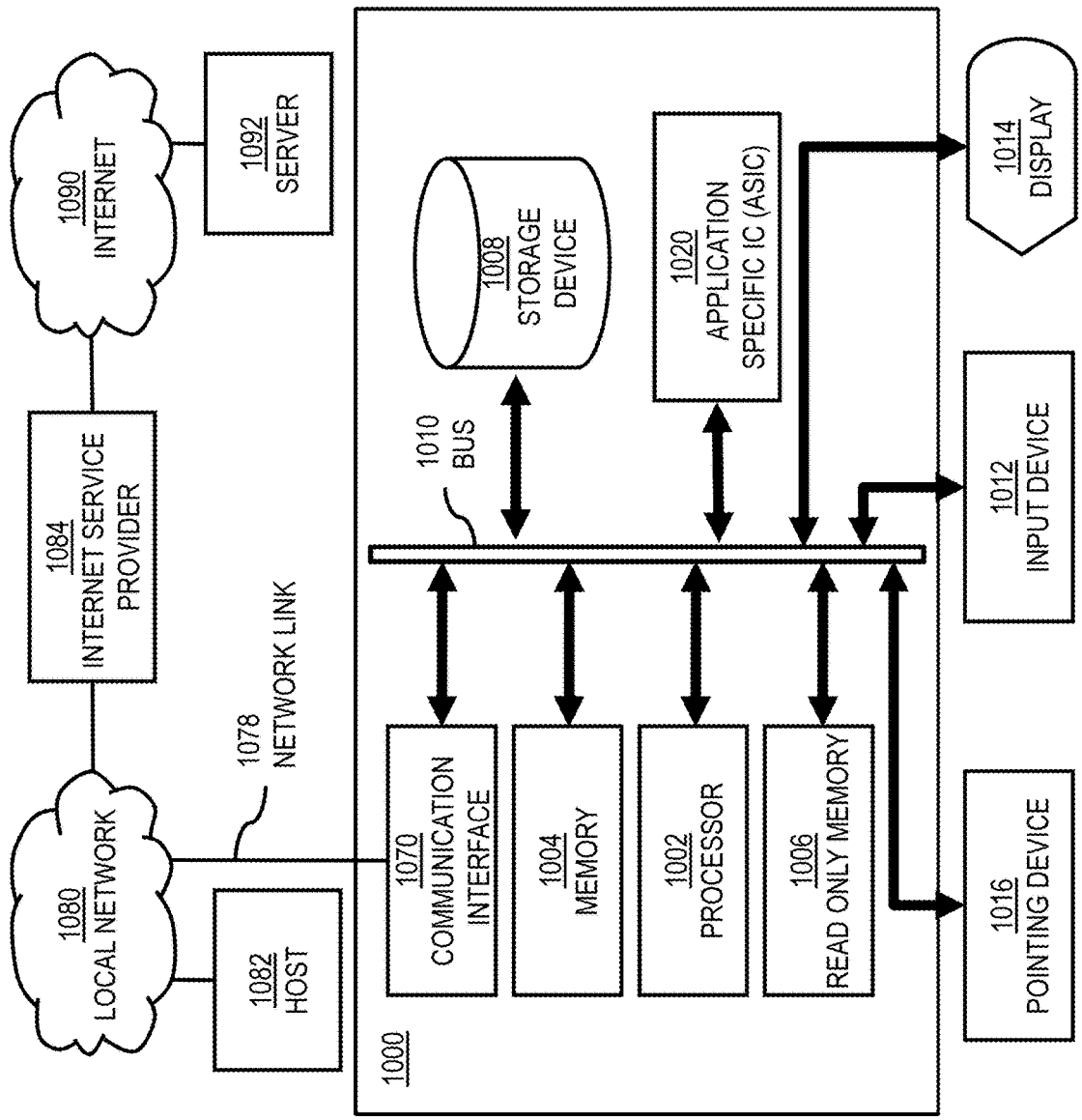
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to generate an optimized parking search route based on one or more other vehicle driving paths as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to generating an optimized parking search route based on one or more other vehicle driving paths. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random-access memory (RAM) or other dynamic storage device, stores information including processor instructions for generating an optimized parking search route based on one or more other vehicle driving paths. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for generating an optimized parking search route based on one or more other vehicle driving paths, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 117 for generating an optimized parking search route based on one or more other vehicle driving paths.

The term non-transitory computer-readable medium is used herein to refer to any medium that participates in providing information to processor 1002, including instructions for execution. Such a medium may take many forms, including, but not limited to, non-volatile media, volatile media and transmission media. Non-volatile or non-transitory media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in any of FIGS. 4-7), cause an apparatus (e.g., the routing module 109, the routing platform 113, the vehicle 101, a UE, etc.) to perform any steps of the various embodiments of the methods described herein.

FIG. 11 illustrates a chip set 1100 upon which an embodiment of the invention may be implemented. Chip set 1100 is programmed to generate an optimized parking search route based on one or more other vehicle driving paths as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to generate an optimized parking search route based on one or more other vehicle driving paths. The memory 1105 also stores the data associated with or generated by the execution of the inventive steps.

Figure 12:
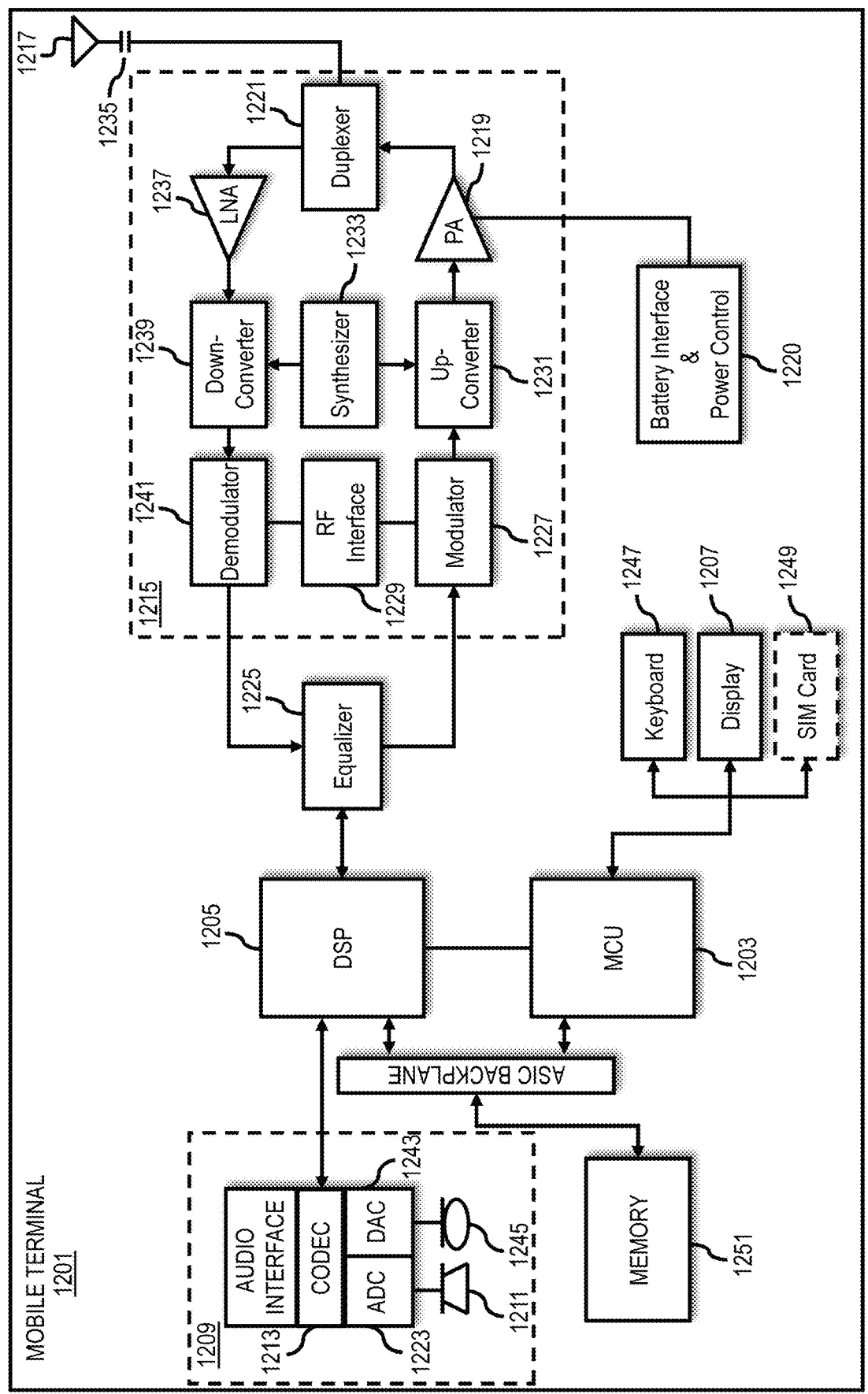
FIG. 12 is a diagram of a mobile terminal (e.g., handset or vehicle or part thereof) that can be used to implement an embodiment of the invention.

FIG. 12 is a diagram of exemplary components of a mobile terminal (e.g., handset or vehicle or part thereof) capable of operating in the system of FIG. 1, according to one embodiment. In one embodiment the mobile station can be the vehicle 101 or a component of the vehicle 101 configured to perform or more of the embodiments described herein. In another embodiment, the mobile station is an example of the UE and can perform embodiments of the processes associated with functions of the UE. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), WiFi, satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to generate an optimized parking search route based on one or more other vehicle driving paths. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable non-transitory computer readable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for generating a parking search route comprising:
    determining that a first vehicle has initiated a search for a parking space;
    determining a first detection and a second detection of a second vehicle by the first vehicle based on at least one sensor of the first vehicle during the search, wherein the second vehicle has not found parking at the first detection and at the second detection;
    calculating a predicted route taken by the second vehicle based on a time difference between the first detection and the second detection; and
    generating the parking search route for the first vehicle based on deprioritizing the predicted route taken by the second vehicle.

2. The method of claim 1, wherein the at least one sensor is a camera sensor, and wherein the first detection, the second detection, or a combination thereof is a line-of-sight detection.

3. The method of claim 1, wherein the predicted route taken by the second vehicle is further based on street geometry data, driving restriction data, parking restriction data, or a combination thereof for a geographic area in which the second vehicle is detected in the first detection, the second detection, or a combination thereof.

4. The method of claim 1, further comprising:
    selecting the second vehicle for generating the parking search route based on determining that the first detection indicates that the second vehicle has a size that is within a threshold similarity as the first vehicle.

5. The method of claim 1, wherein the deprioritizing of the predicted route taken by the second vehicle comprises:
    determining one or more road links associated with the predicted route; and
    decreasing a weight value for including the one or more road links in the parking search route generated for the first vehicle.

6. The method of claim 1, wherein the deprioritizing of the predicted route taken by the second vehicle comprises:
    selecting the parking search route for the first vehicle from among one or more candidate routes based on the parking search route having a minimum overlap with the predicted route taken by the second vehicle.

7. The method of claim 1, wherein the first detection, the second detection, the calculating of the predicted route taken by the second vehicle, the generating of the parking search route for the first vehicle, or a combination thereof is performed locally at the first vehicle.

8. The method of claim 1, wherein the first detection, the second detection, or a combination thereof is based on image recognition of the second vehicle, an identifying feature of the second vehicle, or a combination thereof.

9. The method of claim 1, further comprising:
    deleting data records of the first detection, the second detection, the second vehicle, the predicted route taken by the second vehicle or a combination thereof after the generating of the parking search route for the first vehicle.

10. The method of claim 1, further comprising:
    determining an identifying characteristic of the second vehicle;
    determining that the second vehicle is unlikely looking for parking based on the identifying characteristic; and
    excluding the second vehicle from the generating of the parking search route.

11. An apparatus for generating a parking search route comprising:
    at least one processor; and
    at least one memory including computer program code for one or more programs,
    the at least one memory and the computer program code configured to, with the at least one processor, cause the apparatus to perform at least the following,
        determine that a first vehicle has initiated a search for a parking space;
        determine a first detection, a second detection, or a combination thereof of a second vehicle by the first vehicle based on at least one sensor of the first vehicle during the search, wherein the second vehicle has not found parking at the first detection and at the second detection;
        calculate a predicted route taken by the second vehicle based on a time difference between the first detection and the second detection; and
        generate the parking search route for the first vehicle based on deprioritizing the predicted route taken by the second vehicle.

12. The apparatus of claim 11, wherein the at least one sensor is a camera sensor, and wherein the first detection, the second detection, or a combination thereof is a line-of-sight detection.

13. The apparatus of claim 11, wherein the predicted route taken by the second vehicle is further based on street geometry data, driving restriction data, parking restriction data, or a combination thereof for a geographic area in which the second vehicle is detected in the first detection, the second detection, or a combination thereof.

14. The apparatus of claim 11, further comprising:
    selecting the second vehicle for generating the parking search route based on determining that the first detection indicates that the second vehicle has a size that is within a threshold similarity as the first vehicle.

15. The apparatus of claim 11, wherein the deprioritizing of the predicted route taken by the second vehicle comprises:
- determining one or more road links associated with the predicted route; and
- decreasing a weight value for including the one or more road links in the parking search route generated for the first vehicle.

16. The apparatus of claim 11, wherein the deprioritizing of the predicted route taken by the second vehicle comprises:
- selecting the parking search route for the first vehicle from among one or more candidate routes based on the parking search route having a minimum overlap with the predicted route taken by the second vehicle.

17. The apparatus of claim 11, further comprising:
- determining an identifying characteristic of the second vehicle;
- determining that the second vehicle is unlikely looking for parking based on the identifying characteristic; and
- excluding the second vehicle from the generating of the parking search route.

18. A non-transitory computer-readable storage medium for generating a parking search route, carrying one or more sequences of one or more instructions which, when executed by one or more processors, cause an apparatus to perform:
- determining that a first vehicle has initiated a search for a parking space;
- determining a first detection and a second detection of a second vehicle by the first vehicle during the search, wherein the second vehicle has not found parking at the first detection and at the second detection;
- calculating a predicted route taken by the second vehicle based on a time difference between the first detection and the second detection; and
- generating the parking search route for the first vehicle based on deprioritizing the predicted route taken by the second vehicle.

19. The non-transitory computer-readable storage medium of claim 18, wherein the first detection, the second detection, or a combination thereof is based on at least one camera sensor of the first vehicle, and wherein the first detection, the second detection, or a combination thereof is a line-of-sight detection.

20. The non-transitory computer-readable storage medium of claim 18, wherein the deprioritizing of the predicted route taken by the second vehicle comprises:
- determining one or more road links associated with the predicted route; and
- decreasing a weight value for including the one or more road links in the parking search route generated for the first vehicle.

* * * * *